United States Patent [19]
Sanctuary

[11] 3,822,612
[45] July 9, 1974

[54] CHANGEABLE SPEED AND TORQUE VALVE ACTUATOR
[75] Inventor: Robert E. Sanctuary, Shewsbury, Mass.
[73] Assignee: Worcester Controls Corp., West Boylston, Mass.
[22] Filed: Feb. 5, 1973
[21] Appl. No.: 329,950

[52] U.S. Cl............................. 74/849, 251/134
[51] Int. Cl............................... C11d 17/00
[58] Field of Search............ 74/845, 849; 251/134

[56] References Cited
UNITED STATES PATENTS
2,580,122  12/1951  Parker.......................... 251/251 X Primary Examiner—Leonard H. Gerin
Attorney, Agent, or Firm—Elliot I. Pollock

[57] ABSTRACT

An electric actuator for varying the position of a valve stem comprises an output shaft adapted to be coupled to the valve stem. The output shaft is selectively rotated, between limit positions defined by a pair of electrical limit switches cooperating with cams carried by the output shaft, through the agency of a motor module comprising one or more electric motors and an associated gear box having an output pinion in drive engagement with an output gear coupled to the output shaft. The output gear includes two sets of concentric teeth disposed in spaced relation to one another, and adapted to be engaged individually by the motor module pinion, for driving the output shaft at different torques and speeds in dependence upon which set of output gear teeth is engaged by the pinion. The motor module can be mounted in either of two different positions to cause its pinion to engage one or the other of the output gear teeth sets. The output pinion is preferably located at an eccentric position relative to the motor module so that pinion engagement can be shifted from one to the other of the gear teeth sets by a 180° reversal in the motor module mounting position.

12 Claims, 9 Drawing Figures

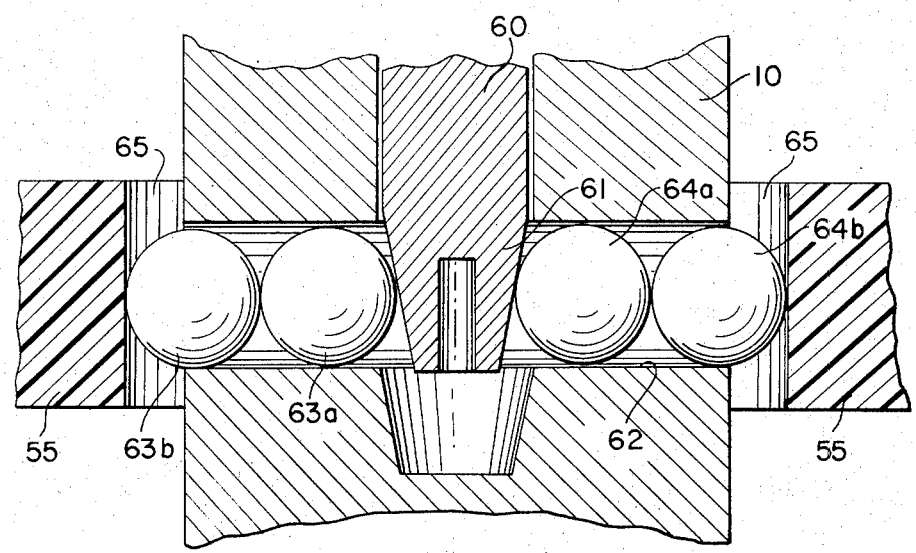
FIG. 4
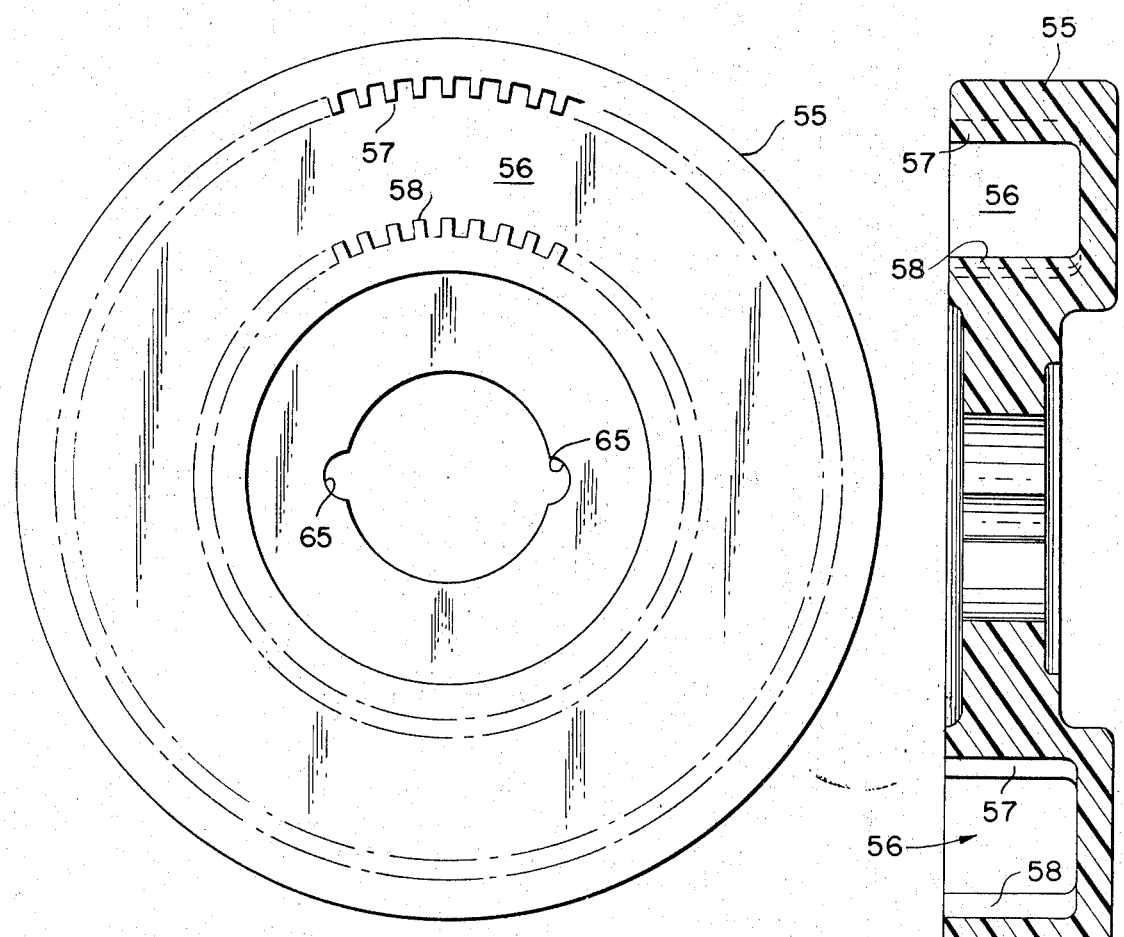
FIG. 5B
FIG. 5A

CHANGEABLE SPEED AND TORQUE VALVE ACTUATOR

BACKGROUND OF THE INVENTION

The present invention is concerned with valve actuators, and it is more particularly concerned with an improved electric actuator adapted to be connected to a valve, such as a ball valve or butterfly valve, for varying the position of the valve stem to effect on-off operating conditions, or to effect flow modulation or desired valve positioning, by automatic or manual remote control. Electric actuators of the general type described above have already been developed in a variety of configurations, and are commercially available. One such actuator is, for example, marketed by Worcester Valve Co., Inc., of Worcester, MA, under its designation "Flowmate 35 Electric Actuators," Such actuators typically comprise an electric motor adapted to be selectively energized and arranged, once energized, to rotate an output shaft, coupled to a valve stem, through an arc defined by at least one limit switch which functions to deenergize the motor after a predetermined angle of rotation has been achieved. When used to operate ball valves or butterfly valves, for example, the actuator, once energized, may cause automatic rotation of the associated valve stem through a 90° arc or more to change the valve from one position to another.

Electric actuators of the types available heretofore have customarily been specified, in the trade, by characteristic operating parameters relating to speed and/or torque; and a user has accordingly been required to select a particular actuator model from a number of different commercially available models, in accordance with the particular service requirements involved. When the size of the valve being operated was changed, or when the torque exhibited by the valves changed under continued operation, or when service conditions made it desirable to operate a valve more quickly or more slowly than had been the practice in the past, the user customarily had to substitute a new actuator, having appropriately different operating characteristics, for the actuator that had been used earlier.

The present invention is intended to provide an improved actuator which obviates the inconvenience, expense, and other disadvantages which have heretofore been merely tolerated under the described conditions.

SUMMARY OF THE INVENTION

The present invention is concerned with a novel electric actuator so constructed that the user can readily vary the actuator operating characteristics, in the field, to alter the torque output thereof or to alter the actuator operating speed. By a relatively simple field modification for example, the available torque output of the actuator can be increased by 50 percent to compensate for an operating condition where an inherent torque buildup occurs due to the material being handled, or to render the actuator capable of operating a somewhat larger valve than the unit might otherwise be capable of handling. Moreover, by the same type of field modification, the output speed of the actuator can be reduced when desired, e.g., to operate a valve somewhat more slowly in modulating or positioning services, to effect more accurate control in the positioning operation and/or to minimize the effect of instability of oscillation in the system due to too quick a reaction of the throttling device employed.

The actuator of the present invention includes an output shaft having the output gear coupled thereto, with said output gear being provided with two sets of output teeth, of like pitch but different number, disposed in concentric spaced relation to one another respectively. The output gear is in turn driven, through one or the other of its teeth sets, by means of a motor module comprising at least one electric motor coupled to a gear box having an output pinion adapted to mesh with a selected one of the output gear sets of teeth. The motor module is adapted to be mounted within the actuator in either of two different positions so that the pinion thereof can mesh with the inner one of said concentric output gear teeth to produce relatively high speed—relatively low torque operation, or so that the pinion thereof can mesh with the outer one of said concentric output gear teeth to produce relatively low speed-relatively high torque operating conditions.

By the arrangement described, the torque and/or speed characteristics of the actuator can be readily varied, in the field, through the simple expedient of shifting the motor module from one to the other of its possible mounting positions. In a preferred embodiment of the invention, to be described hereinafter, the motor module pinion is positioned eccentrically to the motor module so that shifting of the pinion from one to the other of the sets of output gear teeth can be effected simply by unbolting the motor module, rotating it through 180°, and then remounting it in place.

The actuator can, if desired, include a mechanism for de-clutching the output gear from the output shaft to permit manual rotation of the output shaft. The actuator includes a pair of individually adjustable cams, cooperating with limit switches electrically coupled to the motor or motors of the motor module, for defining the arc through which the actuator operates; and additional such cams, associated with other electrical switches, can also be mounted on the actuator output shaft for signalling or other control purposes.

BRIEF DESCRIPTION OF THE DRAWINGS

The foregoing construction, operation, and advantages of the present invention will become more readily apparent from the following description and accompanying drawings in which:

FIG. 4 is a detail view of a clutching arrangement, between the output shaft and bull gear, which may be employed in one embodiment of the present invention;

FIGS. 5A and 5B are side cross-sectional and plan views respectively of the bull gear employed in one embodiment of the present invention;

DESCRIPTION OF THE PREFERRED EMBODIMENTS

Figure 1:
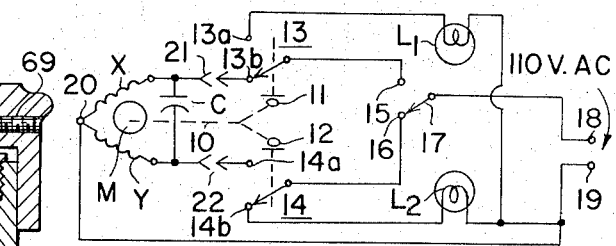
FIG. 1 is a schematic circuit diagram of the actuator of the present invention.

As depicted in FIG. 1, the actuator of the present invention comprises a split phase, capacitor start and run motor M having a pair of coils $x$ and $y$ associated with a capacitor C. The motor includes an output shaft 10 adapted to be connected to the stem of a valve which is to be actuated; and said output shaft 10 carries a pair of angularly spaced cams 11 and 12 which cooperate with a pair of limit switches 13 and 14 respectively. The movable blades of switches 13 and 14 are connected to terminals 15 and 16, respectively, of a remotely operable actuator control switch 17 having a movable blade connected to terminal 18, i.e., to one side of a 110 volt A.C. power source. The other side of said source, terminal 19, is connected to one side of an indicator lamp $L_1$, to one side of a further indicator lamp $L_2$, and to a terminal 20 comprising the junction between motor coils $x$ and $y$. The other side of lamp $L_1$ is connected to terminal 13a of limit switch 13, and the other side of lamp $L_2$ is connected to terminal 14b of limit switch 14. Terminal 13b of limit switch 13 is connected, via a quick disconnect coupling 21, to the junction of motor coil $x$ and capacitor C, and terminal 14a of limit switch 14 is similarly coupled via a quick disconnect coupling 22 to the junction of motor coil $y$ and capacitor C.

With the switches 13, 14 and 17 in the position shown in FIG. 1, a circuit is completed from power terminal 18, the blade of manually operable actuator control switch 17, contact 16, the blade of switch 14 and its contact 14b to lamp $L_2$, and thence to the other terminal 19 of the power source. No power is supplied to coils $x$ and $y$ of motor M, i.e., the motor is not energized or running at this time, and no power is applied to lamp $L_1$. Lamp $L_2$ is energized to indicate that the actuator is resting at one of its limit positions.

If actuator control switch 17 should now be operated so that its blade engages terminal 15, power is removed from lamp $L_2$, causing it immediately to extinguish. A circuit is completed from terminal 18 through the blade of switch 17 and its contact 15, and then through the blade of limit switch 13, its contact 13b, and connector 21 to one said of motor M. Since, at this time, the blade of limit switch 14 is disconnected from its contact 14a, capacitor C is effectively in series with motor coil $y$, and this series circuit is effectively connected in parallel with motor coil $x$. Power flows through these two parallel circuits to terminal 20 and back to the other side 19 of the power source, so that the motor M commences to rotate shaft 10 in a direction towards its opposite limit. The motor runs towards said opposite limit until cam 11 on output shaft 10 engages the blade of limit switch 13, causing said blade to shift from contact 13b into engagement with contact 13a. This removes power from the motor M and simultaneously completes a circuit to lamp $L_1$ causing it to become energized to indicate that the motor has reached its opposite limit. The blades of all of switches 13, 14 and 17 are now in a position opposite to that shown in FIG. 1, the motor M is at rest, and lamp $L_1$ is lit.

A directly analogous sequence of operation occurs if the blade of actuator control switch 17 should now be returned to the position shown in FIG. 1. When this occurs, the circuit to lamp $L_1$ is immediately interrupted, power is supplied from terminal 18 to contact 16 and then via the blade of switch 14 and its contact 14a to a parallel circuit, consisting of coil $y$ in one branch and a series circuit consisting of coil $x$ and capacitor C in its other branch, to terminal 20 and thence back to terminal 19 of the power source, causing the motor to be energized and to run in the opposite direction back towards its original limit. When cam 12 engages the blade of limit switch 14, power to the motor is again interrupted, and a circuit is completed to lamp $L_2$, i.e., the actuator returns to the operating condition depicted in FIG. 1, and is at rest at its original limit.

It should be noted that, once the actuator starts moving in a given direction, it can be instantaneously reversed simply by reversing the position of actuator switch 17 without waiting for the actuator to reach a limit in the direction it is then moving. Once the actuator starts moving in a given direction, both of limit switches 13 and 14 are disengaged by their respective cams 11 and 12, and the circuit is then in condition for instantaneous reversal upon reversal of the position of the actuator operating switch 17. In short, the direction of rotation of the actuator is dependent entirely upon the position of the switch 17 once the two limit switches are closed. It should further be noted that the indicator lamps $L_1$ and $L_2$ are optional features which can be provided by a user if he wishes, and need not form a portion of the actuator circuit. The actuator can include terminals to which such lamps can be connected if desired.

As has been discussed earlier, the motor M forms a portion of a motor module, to be described hereinafter, which includes an output pinion adapted to be shifted from one to another set of teeth in an output gear forming a portion of the actuator. When the motor module is reversed or changed in position to alter the speed and/or torque of the actuator, the power connections to the motor must be reversed to assure that the actuator runs in the correct direction. This reversal of electrical connections can be effected in various ways. The quick-disconnect coupling 21 and 22, in series with limit switches 13 and 14, are intended to illustrate one possible arrangement for permittting reversal of the electrical connections, i.e., when the motor module is shifted in position, the electrical connections can simultaneously be reversed by disconnecting couplings 21 and 22 and then reconnecting their separated parts so that the upper terminal of the motor is connected to contact 14a of limit switch 14, and the lower terminal of the motor is connected to the contact 13b of limit switch 13. Other arrangements will be apparent to those skilled in the art.

Figure 2:
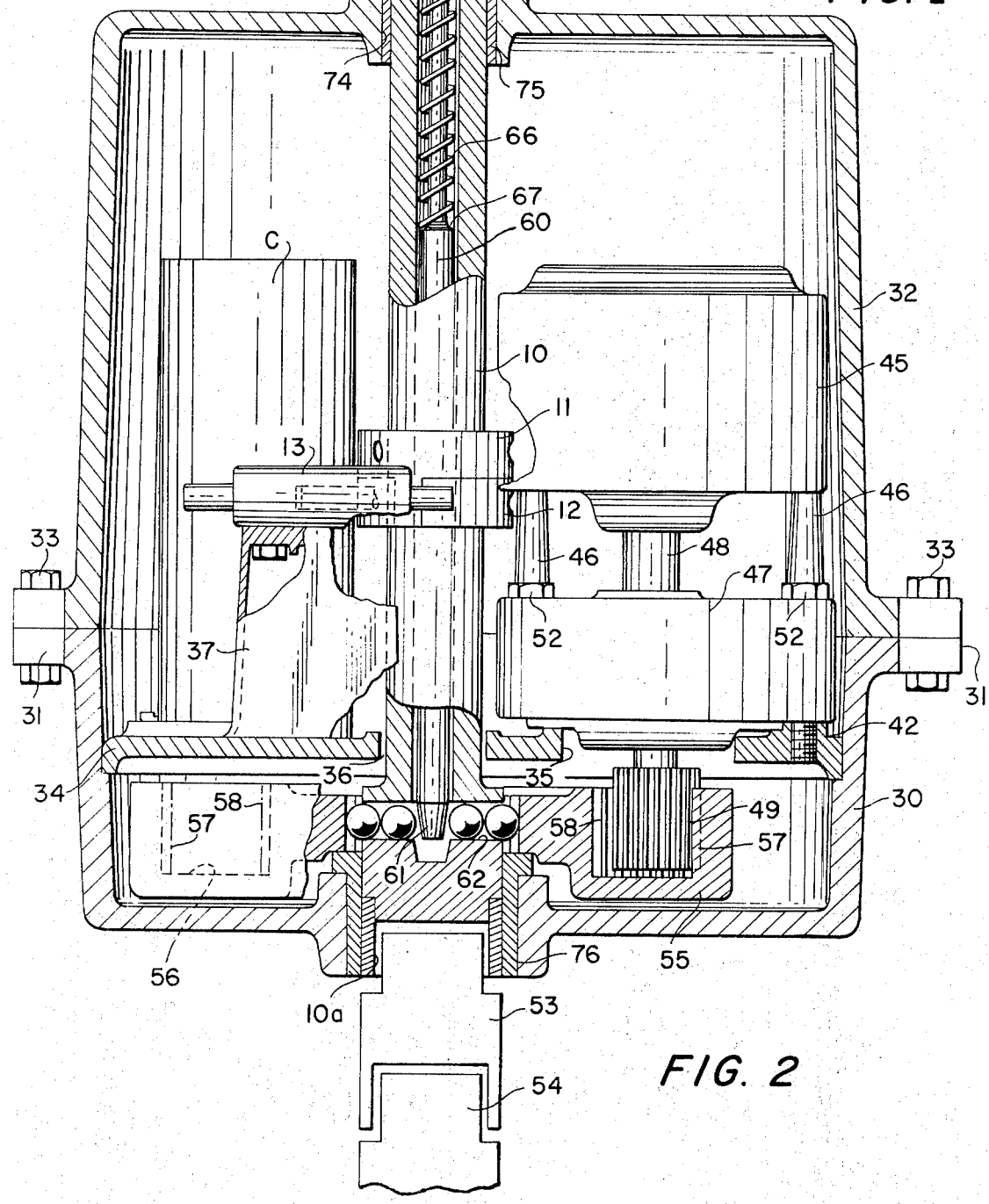
FIG. 2 illustrates, in partial section, the mechanical construction of the actuator.

The preferred configuration of an actuator operating in the fashion described in reference to FIG. 1, is shown in FIG. 2 et seq. Referring initially to FIG. 2, it will be seen that the actuator comprises a base 30 provided with spaced outstanding flanges 31 to which a cover 32 may be removably attached through the agency of bolts 33. The base 30 includes interior shoulders adapted to support a base cover plate 34 upon which various components of the actuator may be mounted.

Figure 6:
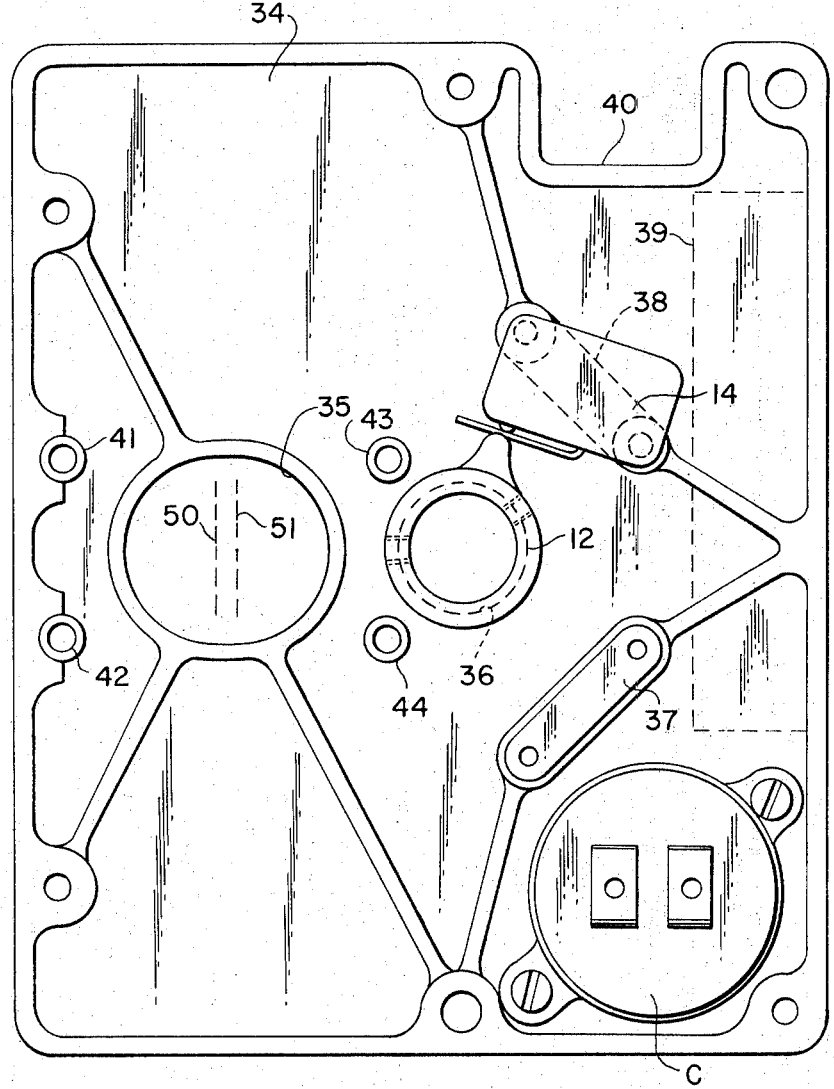
FIG. 6 is a plan view of the base plate employed in the present invention.

The base plate 34 is shown in FIG. 6 and comprises a unitary die cast element provided with an aperture 35, through which the pinion of a motor module may extend (as will be described), and with a further aperture 36 through which the output shaft 10 of the actuator may extend. Base plate 34 is further provided with a pair of integral pedestals 37 and 38 upon which the limit switches 13 and 14 may be mounted at positions angularly spaced from one another relative to the output shaft 10 and adjacent the paths of travel of cams 11 and 12 carried on said shaft. The capacitor C associated with the motor M of FIG. 1 may be mounted upon the base plate 34 as illustrated in FIGS. 2 and 6; and the various electrical connections already described in reference to FIG. 1 may be effected via a terminal strip (not shown) carried by the base plate in a general location designated by broken line 39 (or at any other appropriate location within the actuator) and thence passing via a recess 40 formed in one edge of the base plate to appropriate conduit connectors (not shown) in base 30 of the actuator.

Base plate 34 includes four spaced, upstanding protuberances 41, 42, 43 and 44, located about aperture 35 and adapted to engage complementary recesses formed in the bottom of the motor module for accurately locating the module relative to aperture 35. The motor module is adapted to be fixedly but removably mounted on protuberances 41–44 in either of two predetermined positions, reversed from one another by 180°; and a shifting of the motor module from one to the other of its mounting positions effects a change in the output gear ratio of the actuator to effect a related change in the output torque and/or speed of the actuator.

More particularly, referring to FIGS. 2 and 6 together, it will be seen that the motor module comprises a motor 45 attached via supports 46 to a gear box 47. The motor 45 and gear box 47 are thus of unitary configuration and are adapted to be mounted or shifted in position, as a unit, relative to the upper surface of base plate 34. Gear box 47 provides a step-down ratio between motor shaft 48 (which is coupled to an input gear in the gear train of said gear box) and an output pinion 49 (driven by the output gear of said gear train). The axis of pinion 49 is displaced from the axial center of the locus of supports 46; and the arrangement is such that, when the motor module 45, 47 is turned through 180°, from one to the other of its two possible mounting positions on protuberances 41–44, the axis of pinion 49 shifts laterally from one to the other of two possible positions designated in FIG. 6 by the broken lines 50 and 51. The lateral displacement of the pinion is relatively small, i.e., the distance between lines 50 and 51 is in the order of one-eighth inch; but the displacement is nevertheless sufficient to shift pinion engagement from one to the other of two sets of teeth provided in an output gear forming a portion of the actuator. The motor module is retained in position upon base plate 34 by means of four bolts 52 (only two of which are shown in FIG. 2) which pass through sleeves at the corners of the gear box 47 and which thread engage the interior of protuberances 41–44 respectively. The module can accordingly be shifted from one to the other of its mounting positions by simply loosening bolts 52, turning the module through 180°, dropping the module back onto protuberances 41–44, and then retightening bolts 52.

FIG. 2 illustrates only a single motor 45 associated with gear box 47, but it should be understood that more than one motor can be associated with a single gear box if increased power is desired. More particularly, a second motor can be mounted on gear box 47 alongside motor 45 (i.e., behind the plane of FIG. 2) with its output shaft also connected to an appropriate gear in gear box 47, so that the output shafts of the two motors drive the gear train, in gear box 47, in parallel.

Figure 3:
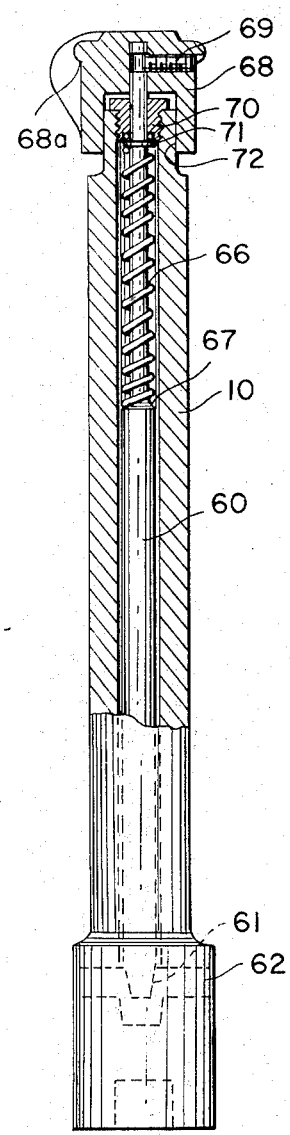
FIG. 3 is a detail view of the output shaft employed in one embodiment of the present invention.

The actuator output shaft 10, as best depicted in FIG. 2, passes aperture 36 in base plate 34; and its lowermost end 10a is slotted to receive an adapter 53 of proper configuration to connect the output shaft 10 to the stem 54 of a valve to be actuated, e.g., a ball valve or butterfly valve. An output bull gear 55 (see FIGS. 2, 5A and 5B) is connected to output shaft 10 within the base 30 of the actuator at a position below base plate 34. The particular connection employed in the embodiment illustrated in FIG. 2 (and in FIGS. 3 and 4) permits the output bull gear 55 to be disengaged from output shaft 10 when desired; but this is not mandatory and, if desired, the output gear 55 may be fixedly connected to shaft 10. Output gear 55 includes an annular recess 56 the facing sides of which are provided with two sets of gear teeth 57 and 58. The pitch of the teeth in these two sets is identical, but the number of teeth in the two sets differ from one another. In a typical embodiment of the invention, the outer set of teeth 57 may include 84 teeth, and the inner set of teeth 58 may include 54 teeth. The radial spacing between the two sets of teeth 57 and 58 is greater than the diameter of pinion 49 so that when the pinion engages one set of teeth it is disengaged from the other set. In view of the different numbers of teeth provided in the sets 57 and 58, when the pinion 49 engages the outer set of teeth 57 (as depicted in FIG. 2) the bull gear 55 and output shaft 10 attached thereto rotate at a slower, and with greater torque, than is the case when pinion 49 engages the inner set of teeth 58 of bull gear 55.

As described earlier, the position of pinion 49, relative to the axis of shaft 10 and the axis of output gear 55, may be shifted by loosening bolts 52, lifting the motor module off of protuberances 41–44, turning the motor module through 180°, dropping the motor module back onto the protuberances 41–44, and fastening the same in place by retightening bolts 52. This opertion causes the axis of pinion 49 to shift laterally from one to the other of positions 50 and 51 (see FIG. 6) to cause the pinion to shift in engagement from one to the other of the output gear tooth sets 57 and 58, thereby to permit the output torque and/or speed of the actuator to be changed when desired or necessary. A similar result can be achieved by other arrangements falling within the scope of the present invention, e.g., a movable transfer gear, adapted to be located in either of two predetermined positions, could be provided between the output pinion of a fixed position motor module and the output gear of the actuator, to transfer drive from the module output pinion to a selected one or the other of two sets of output gear teeth. Alternatively, the output gear 55 could be provided with an upstanding annulus having teeth formed on its opposing sides; and the motor module could be adapted for mounting in either of two predetermined positions laterally and/or angularly displaced from one another, operative to cause its output pinion to engage one of the other toothed side of such an upstanding annulus. Of these various arrangements, the arrangement shown in FIG. 2 is preferred since the formation of tooth sets 57 and 58 on the inner facing sides of annulus 56 permits the pinion position to be shifted by only a relatively small amount to effect a shift from one to the other of the output gear teeth sets; and this in turn reduces the eccentricity required of the output pinion 49 and achieves a more balanced structure.

As mentioned earlier, a clutching arrangement may be provided, if desired, between the output shaft 10 and bull gear 55 to permit these two elements to be disengaged from one another when it is desired to rotate valve stem 54 manually. To this effect, the shaft 10 may include an interior, slidable clutch pin 60 the lower end 61 of which is tapered and disposed adjacent a through bore 62 extending diametrically through the lower end of shaft 10. Bore 62 receives pairs of ball bearings 63a, 63b and 64a, 65b (see FIG. 4) which fill the bore space between the tapered lower end 61 of clutch pin 60 and diametrically opposed arcuate recesses 65 formed adjacent the interior bore of bull gear 55.

Clutch pin 60 is movable vertically within shaft 10 and is urged in downward direction by a spring 66, the lower end of which engages a shoulder 67 on pin 60 and the upper end of which is retained in place adjacent the top of shaft 10. Under normal operating conditions, spring 66 pushes clutch pin 60 downwardly so that the tapered surface at its lower end 61 urges ball 63a, 63b and 64a, 64b outwardly into engagement with recesses 65 in the bull gear 65; and this in turn locks bull gear 55 to output shaft 10. When it is desired to disengage the bull gear from the output shaft, a cap 68 attached to pin 60 is manually pulled upwardly against the restraint of spring 66; and this in turn lifts tapered end 61 away from balls 63a, b and 64a, b to permit the balls to move inwardly within bore 62 thereby to disengage the bull gear 55 from shaft 10.

Cap 68 is fastened to the upper end of clutch pin 60 by means of a set screw 69. The upper end of spring 66 is fixed in position relative to the output shaft 10 by a threaded element 70 which is screwed into the upper end of shaft 10. An O-ring is disposed below element 70; a washer 71 is disposed below said O-ring; and the upper end of spring 66 bears on said washer. The O-ring merely acts to seal the interior of output shaft 10 against water and the like. Cap 68 includes finger pieces 68a to facilitate pulling the cap, and attached clutch pin 60, upwardly. When the cap 68 is pulled upwardly, it exposes some flats 72 at the upper end of output shaft 10 for engagement by a wrench or the like to permit output shaft 10 to be turned manually. To give an indication of the position of the valve stem under these manual operating conditions, cap 68 preferably includes an outstanding unidirectional protuberance 73, the alignment of which corresponds to that of the valve element driven by valve stem 54.

The upper end of shaft 10 extends through an aperture 74 in cover 32, to permit the declutching operation to be effected from the exterior of the actuator, and is journalled in a bushing 75 mounting on cover 32. The lower end of shaft 10 is journalled in a bushing 76 at the lower end of base 30. In addition, a snap ring (not shown) engages shaft 10 at a position adjacent base plate 34 to limit axial movement of shaft 10. Other shaft arrangements can be effected, e.g., the shaft 10 need not extend through the upper side of cover 32, and can be disposed entirely within the actuator housing, if the structure is modified to eliminate the declutching arrangement.

Figure 7A:
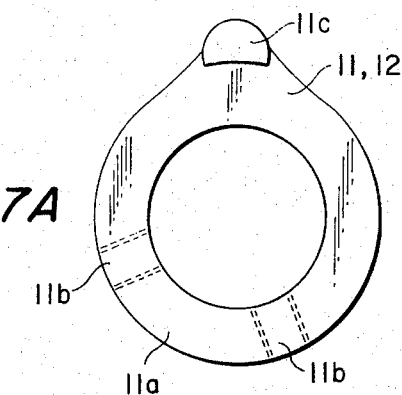
FIGS. 7A and 7B illustrate the cam construction employed in the actuator of the present invention.
Figure 7B:
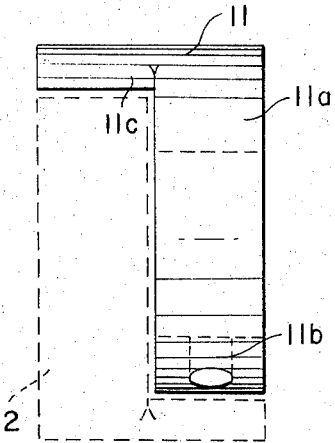

Cams 11 and 12, previously described in reference to FIG. 1, are shown in position upon output shaft 10 in FIG. 2; and their relationship to limit switches 13 and 14 will be apparent from the description previously given, as well as from the showings in FIGS. 2 and 6. As illustrated in FIGS. 7A and 7B, each cam includes a circular body 11a provided with a pair of tap holes 11b for receiving set screws to mount the cam in a desired radial and axial position on shaft 10. Each circular body 11a includes a pair of flat side portions which extend at angles to one another and which merge into an upstanding nose 11c, extending at right angles to the plane of body 11a and spaced outwardly from the axis of the cam by a distance greater than other portions of the body 11a. The nose 11c of each cam is adapted to operate the switch blade of an associated limit switch (see FIG. 6). The L-shaped cross-section cam configuration thus provided permits the two cams 11 and 12 to be mounted upon shaft 10 in a nested arrangement, as best shown in FIG. 7B, so that the nose portion of each cam extends alongside the circular body of the other cam. The cams are mounted upon shaft 10 at axis positions corresponding to the positions of limit switches 13 and 14. The radial (and axial) positions of the cams can be readily adjusted by loosening and retightening their associated set screws. As a result, the limit positions of the actuator can be readily varied to define any desired arc up to and including 180°.

Other cam arrangements are possible. For example, the exterior of shaft 10 may be threaded, and the cams associated therewith can be threaded internally and mounted within guides to ride up and down, in axial directions relative to shaft 10, as the shaft 10 is rotated. The limit switches can, in such an arrangement, be disposed in vertically displaced relation to one another alongside shaft 10 so that each limit switch is actuated when its associated cam is moved upwardly or downwardly to a preselected axial position relative to the rotating shaft 10. An arrangement of this type can be used to operate the limit switches after rotation of the output shaft 10 through any desired angle including multiples of 360°. Moreover, more than one set of cams can be provided on the output shaft. For example, the arrangement of FIG. 2 illustrates only two cams 11 and 12, operating two switches 13 and 14 respectively. An additional set of cams, similar to cams 11 and 12, can be mounted on shaft 10 at a position above cams 11 and 12, to operate a further set of switches for any purpose the user may desire, e.g., the further switches can be additional limit switches to temporarily halt the actuator at an intermediate position, or they can be used for signalling purposes or for energizing an external piece of equipment at an appropriate time during operation of the actuator or at the end of an actuation cycle.

While I have thus described preferred embodiments of the present invention, many variations will be apparent to those skilled in the art. The foregoing description is accordingly intended to be illustrative only and not limitative of the present invention; and all such variations and modifications as are in accordance with the principles described are meant to fall within the scope of the appended claims.

Having thus described my invention I claim:

1. In a valve actuator of the type comprising electric motor drive means, a rotatable output shaft adapted to be coupled to the stem of a valve, means coupling said drive means to said output shaft, and control means including a circuit having at least one position responsive device operated in response to rotation of said output shaft for selecting energizing and deenergizing said electric motor drive means to effect controlled rotation of said output shaft and stem thereby to control the flow of fluid through the valve, the improvement wherein said coupling means includes an output gear having two concentric sets of gear teeth, of like pitch but different in number respectively, radially displaced from one another, said electric motor drive means including an output pinion adapted to mesh with either of said sets of gear teeth, and mounting means for locating said pinion in a selected one of two laterally displaced positions relative to said output gear to effect mesh engagement between said pinion and a selected one of said two sets of output gear teeth thereby to permit a variation in the output torque and rotational speed of said output shaft.

2. The actuator of claim 1 wherein said output gear includes an annular recess, said two sets of teeth being located respectively on opposing sides of said annular recess.

3. The actuator of claim 1 wherein said output pinion is radially displaced from the shaft of the electric motor in said drive means, said mounting means being adapted to retain said electric motor in either of two mount positions which are angularly displaced from one another, to permit alteration in the position of said pinion relative to the axis of said output gear.

4. The actuator of claim 3 wherein said two mount positions are angularly displaced from one another by 180°.

5. The actuator of claim 1 wherein said electric motor drive means comprises a module which includes at least one electric motor and a gear box interconnected to one another, said pinion being affixed to said gear box, said module being selectively movable, as a unit, between two predetermined mounting positions.

6. The actuator of claim 5 wherein said actuator comprises a housing, said mounting means comprising a plate disposed within said housing and having locating means thereon for defining the mounting positions for said module adjacent one side of said plate, said output gear being disposed on the opposite side of said plate, said output pinion extending from the gear box of said module through an aperture in said plate to said output gear.

7. The actuator of claim 6 wherein said output shaft extends through a further aperture in said plate, said plate including means on said one side thereof for supporting a pair of spaced electrical switches adjacent a portion of said shaft, cam means on said portion of said shaft for operating said switches upon rotation of said shaft, a further portion of said output shaft extending past said opposite side of said plate, and means for coupling said further portion of said shaft to a valve stem.

8. The actuator of claim 1 wherein said output gear is separably coupled to said output shaft, and manually operable means for selectively decoupling said output gear from said output shaft to permit manual rotation of said output shaft.

9. The actuator of claim 5 wherein said mounting means comprises locating means engageable with preselected portions of said module for uniquely defining said two pinion positions.

10. The actuator of claim 9 wherein said mounting means includes means for releasably securing said module in the positions defined by said locating means.

11. The actuator of claim 10 wherein said two predetermined module mounting means are displaced from one another by an angle.

12. The actuator of claim 11 wherein said angle is 180°.

* * * * *